United States Patent [19]

Tharakan

[11] Patent Number: 6,085,228
[45] Date of Patent: Jul. 4, 2000

[54] METHODS AND APPARATUS FOR A PROPERTY EDITING MECHANISM FOR A NETWORK COMPUTER ENVIRONMENT

[75] Inventor: George Tharakan, Sunnyvale, Calif.

[73] Assignee: Sun Microsystems, Inc., Palo Alto, Calif.

[21] Appl. No.: 09/061,803

[22] Filed: Apr. 17, 1998

[51] Int. Cl.[7] ...................................................... G06F 15/16
[52] U.S. Cl. ........................ 709/203; 709/200; 709/201; 709/217; 709/228; 707/10; 707/100; 707/200
[58] Field of Search ..................................... 709/200–203, 709/217–220, 223–224, 227–229, 302–304; 707/1, 8–10, 100–104, 201, 513

[56] References Cited

U.S. PATENT DOCUMENTS

| | | | |
|---|---|---|---|
| 5,655,081 | 8/1997 | Bonnell et al. | 709/202 |
| 5,706,502 | 1/1998 | Foley et al. | 707/10 |
| 5,732,219 | 3/1998 | Blumer et al. | 709/227 |
| 5,794,006 | 8/1998 | Sanderman | 709/223 |
| 5,802,530 | 9/1998 | Van Hoff | 709/203 |
| 5,832,505 | 11/1998 | Kasso et al. | 707/104 |
| 5,889,942 | 3/1999 | Orenshteyn | 709/203 |
| 5,919,247 | 7/1999 | Van Hoff et al. | 709/217 |
| 5,956,509 | 9/1999 | Kevner | 709/203 |
| 5,995,940 | 11/1999 | Ramaley | 705/9 |

OTHER PUBLICATIONS

Mary Campione and Kathy Walrath, "The Java™ Tutorial", Addison–Wesley, 1996.

"Java Web Server Overview", visited at http://www.sun.com/software/jwebserver on Jun. 1, 1999, 7 pages.

James Gosling, Bill Joy, and Guy Steele, "The Java Language Specification", pp. vii–xx and 1–6, Addison–Wesley, 1996.

*Primary Examiner*—Ahmad F. Matar
*Assistant Examiner*—Bharat Barot
*Attorney, Agent, or Firm*—Finnegan, Henderson, Farabow, Garrett & Dunner, L.L.P.

[57] ABSTRACT

A system allows an administrator to edit, from a client, property files that reside on a server. The client issues a request to the server for property information for an application program. After receiving the property information, the client passes it to a configuration portion of the application program, where the property information is edited by the administrator. The client receives the edited property information and sends it to the server, where it is stored.

26 Claims, 5 Drawing Sheets

METHODS AND APPARATUS FOR A PROPERTY EDITING MECHANISM FOR A NETWORK COMPUTER ENVIRONMENT

BACKGROUND OF THE INVENTION

A. Field of the Invention

This invention generally relates to distributed computer systems and, more particularly, to methods and apparatus for remotely editing property information.

B. Description of the Related Art

Early computer systems and application programs provided their users with simple, text interfaces for entering and displaying information. Such interfaces were normally predefined, and there was little need or capability for a user to customize the interface. Since then, user interfaces and application programs have become increasingly robust and correspondingly complex. For example, many modern computer systems employ graphic user interfaces that contain numerous windows and panels. Also, modern application programs provide a wealth of capabilities, only a fraction of which are used by any one user.

These complex systems and application programs become cumbersome unless users can configure them to suit their needs best. For example, users may wish to customize the color of the graphical desktop or the commands that appear on the toolbar of a word processing application program. This configuration is generally accomplished by using property files that are stored at each user's computer. When a computer is turned on, or when an application program is launched, configuration information is read from the appropriate file(s) to configure the system properly. Although these property files make matters easier for system users, managing them makes matters more complicated for system administrators.

Much of the burden on administrators stems from the fact that they must configure and maintain property files at each of the numerous users' computers. Accordingly, one approach for reducing the burden on system administrators is to employ the concept of network computers. In a network computer system, all necessary files, including property files, are stored centrally on a server and are transferred to the network computers as needed for execution. As a result, the system administrator need only configure and maintain property files at one location, namely the server.

One problem associated with network computer systems arises because network computers typically have neither the capability nor the authorization to alter files at the server, for security reasons. As a result, a system administrator cannot remotely edit property files on a server from a network computer. Instead, the system administrator must directly log into the server and make changes there.

Another problem relates to configuring application programs to take advantage of the different levels of property configuration possible in a network computer system. In such a system, property files can be organized by user, by groups of users, or by network computer. User properties are those that are specific to a particular user, regardless of the network computer on which that user is logged in. Group properties are those that are common to one or more users. Host properties are those that are specific to a network computer, regardless of which user is logged into that computer. System administrators should be able to configure these property files in a manner that is transparent to application programs.

There have been some attempts made to address these problems. The Netra™ product from Sun Microsystems Computer Corporation allows system administrators to remotely edit property files by using Common Gateway Interface (CGI) scripts in conjunction with HyperText Markup Language (HTML) forms.[1] Although this approach works reasonably well for simple, static configurations, it is cumbersome in situations involving dependencies between property fields. Moreover, this product does not allow system administrators to configure the different levels of property files in a manner that is transparent to application programs.

[1] Sun, Sun Microsystems, Sun Microsystems Computer Corporation, JavaSoft, the Sun Logo, Netra, Java Server, Java, and HotJava Views are trademarks or registered trademarks of Sun Microsystems, Inc. in the United States and other countries.

The Java Server product from JavaSoft also allows system administrators to remotely edit property files that reside on a server. This is accomplished by using an applet that interfaces with a servlet using the HyperText Transfer Protocol (HTTP). An applet is a class created by using the Java™ programming language. The concept of an applet, and the Java programming language, are described in a text entitled "The Java™ Tutorial" by Mary Campione and Kathy Walrath, Addison-Wesley, 1996, the contents of which are hereby incorporated by reference. A servlet is similar to an applet, but it executes at a server. Although the Java Server product is less cumbersome than the Netra product, it also does not allow configuration of different levels of property files in a manner that is transparent to application programs.

There exists, therefore, a need for a solution that allows system administrators to remotely and dynamically edit property files in a network computer environment. Moreover, there is a similar need for a solution that allows system administrators to configure property files in a manner that is transparent to application programs.

SUMMARY OF THE INVENTION

To meet these needs, apparatus and methods consistent with the present invention allow a system administrator to remotely configure different levels of property files in a manner that is transparent to application programs. More specifically, a method for allowing a system administrator to remotely edit property files in a distributed system comprises receiving, at a client, property values from a system administrator. Next, an object containing the property values is created at the client. That object is transmitted to a server, which creates and stores a property file based on the object.

BRIEF DESCRIPTION OF THE DRAWINGS

The accompanying drawings, which are incorporated in and constitute a part of this specification, illustrate an embodiment of the invention and, together with the description, explain the advantages and principles of the invention. In the drawings.

DETAILED DESCRIPTION

Reference will now be made in detail to methods and apparatus consistent with the present invention as illustrated in the accompanying drawings. Wherever possible, the same reference numbers will be used throughout the drawings and the following description to refer to the same or like parts.

A. Overview

Methods and apparatus consistent with the present invention allow system administrators to remotely and dynamically edit property files in a network computer environment. These methods and apparatus also allow system administrators to configure user, group, and network computer property files in a manner that is transparent to application programs.

After logging into a network computer, the system administrator executes an administrative applet and selects an application program and a group of users. In response, the administrative applet retrieves the application program's property information for that group from the server. The administrative applet passes this property information to a configuration class of the application program. The configuration class interprets the property information and presents it in a manner that can be readily understood and edited by a system administrator.

When the system administrator is finished editing the property information, the configuration class passes the edited information to the administrative applet. The administrative applet, in turn, sends the edited values to the server, which stores them in the application program's property file that corresponds to the selected group. A similar approach may be used to edit user or network computer property files.

Importantly, throughout this process, the configuration class need not be aware of whether the property information corresponds to that of a user, a network computer, or a group. Instead, the configuration class merely knows that it has been given some property information to be edited.

B. Architecture

Figure 1:
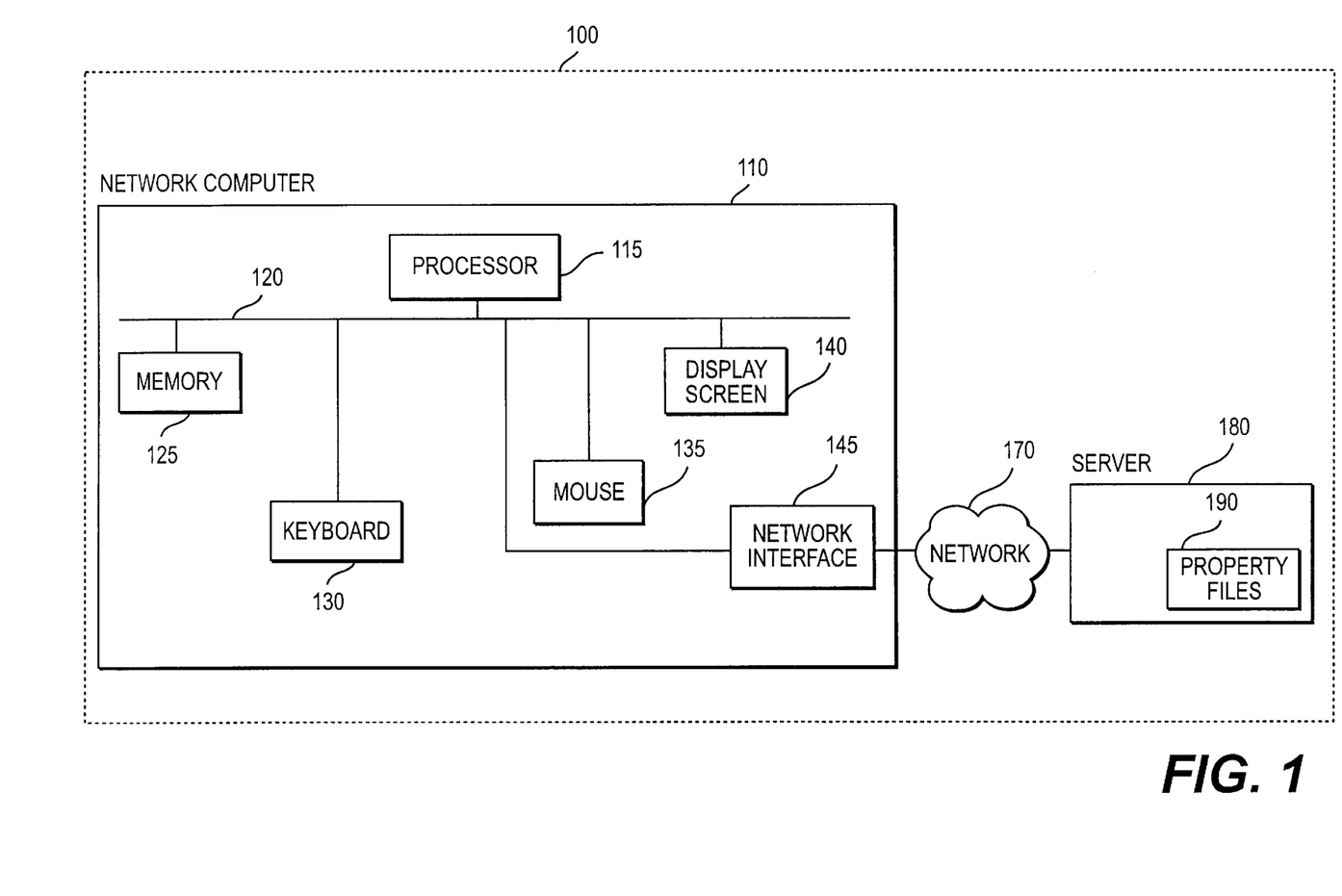
FIG. 1 is a block diagram of a computer system consistent with the present invention.

FIG. 1 is a block diagram of a computer system in which the present invention may be implemented. System 100 consists of a network computer 110 connected to a server 180 via a network 170. System 100 is suitable for use in the HotJava™ Views™ user environment, although one of skill in the art will recognize that methods and apparatus consistent with the present invention may be applied to other suitable user environments. HotJava Views is an application developed by Sun Microsystems, Inc. for network computers. It is described, for example, in a document entitled Designing the HotJava Views™ User Environment For a Network Computer, Sun Microsystems, Inc. (1998), the contents of which are hereby incorporated by reference and attached as an appendix. Hotjava Views is written using, and manipulates the user interface via, the Java programming language.

Network computer 110 consists of several components that are all interconnected via a system bus 120. Specifically, network computer 110 contains a processor 115 connected to a memory 125. The user inputs information to network computer 110 via a keyboard 130 and a pointing device, such as a mouse 135. In return, information is conveyed to the user via display screen 140. Network computer 110 communicates with other computers on network 170 via a network interface 145, examples of which include Ethernet or dial-up telephone connections. The operating system, applications, and data (including property files 190) required by network computer 110 are centrally stored at server 180, and are loaded over network 170 as needed. When network computer 110 is first turned on, server 180 provides it with a boot image that includes an operating system, such as JavaOS 1.0, developed by Sun Microsystems, Inc. This operating system and application environment include a graphic user interface that supports multiple application programs, such as: electronic mail, electronic calendaring, a directory of people in the organization, and a web browser for viewing documents on a network (for example, an intranet or on the Internet).

In object-oriented programming, each application program consists of a group of classes. As is well known in the art, a class is a collection of data and the methods that operate on that data. One of these classes, hereinafter called the "configuration class," is typically designed to facilitate property information editing. More generally, the "configuration portion" of an application program is that portion that is designed to facilitate property information editing. The configuration class interprets abstract, numerical property information and presents it in the form of labels, descriptions, and values that can be easily understood by a user, such as a system administrator. For example, a configuration class may interpret a value of "2" from the property file of a calendaring application as meaning that the displayed week should begin on Tuesday. Methods and apparatus consistent with the present invention take advantage of these configuration classes, as described below in reference to FIG. 5.

Figure 2:
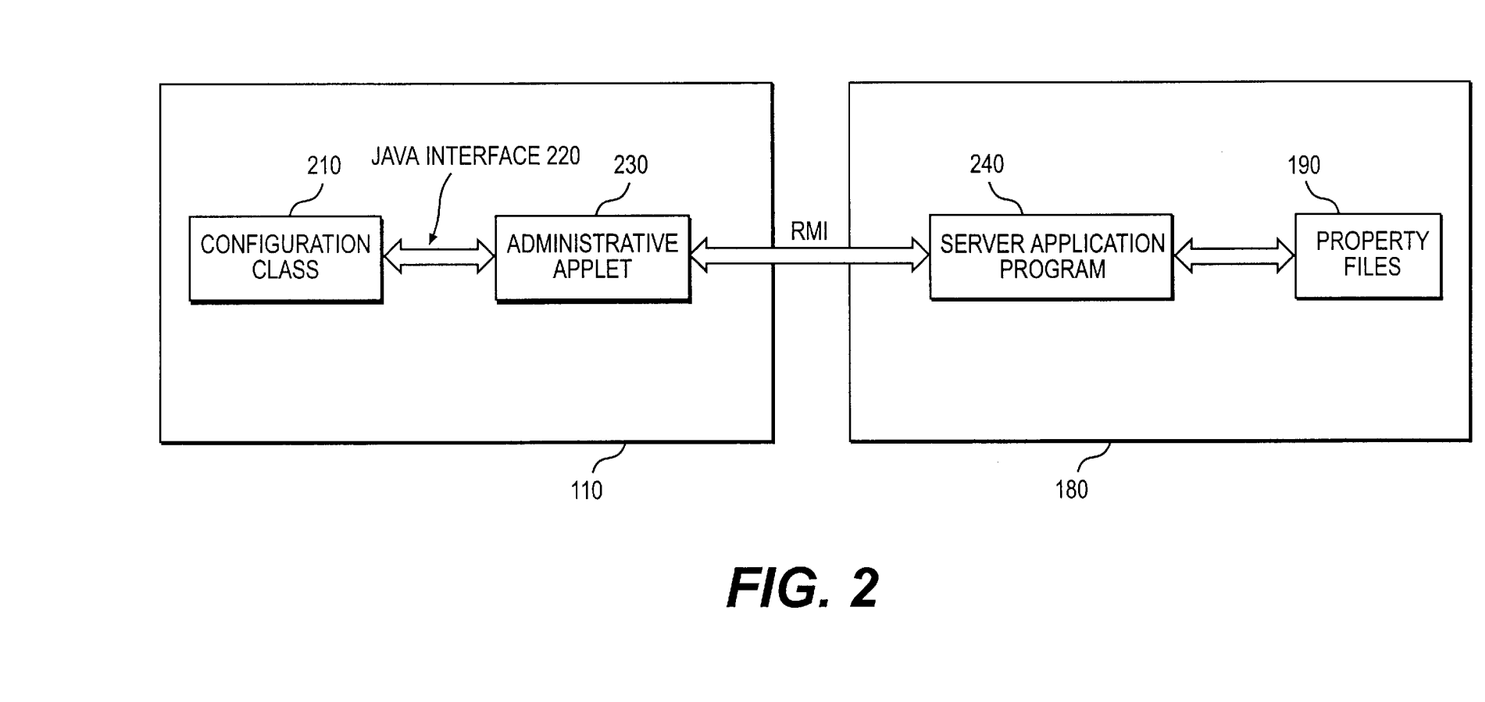
FIG. 2 is a block diagram of the interaction between functional components of a system consistent with the present invention.

FIG. 2 is a block diagram of the interaction between functional components of a system consistent with the present invention. These components include a configuration class 210 and an administrative applet 230 that are executing on network computer 110. Configuration class 210 communicates with applet 230 via a standard Java Interface 220.

Applet 230 communicates with a server application program 240 that executes on server 180. Both applet 230 and server application program 240 are preferably written using the Java programming language. The communication between applet 230 and server application program 240 is accomplished using the remote method invocation (RMI) capability of Java. Server application program 240, in turn, interfaces with property files 190 using the Java API, as described, for example, in a text entitled "The Java Language Specification" by James Gosling, Bill Joy, and Guy Steele, Addison-Wesley, 1996.

Figure 3:
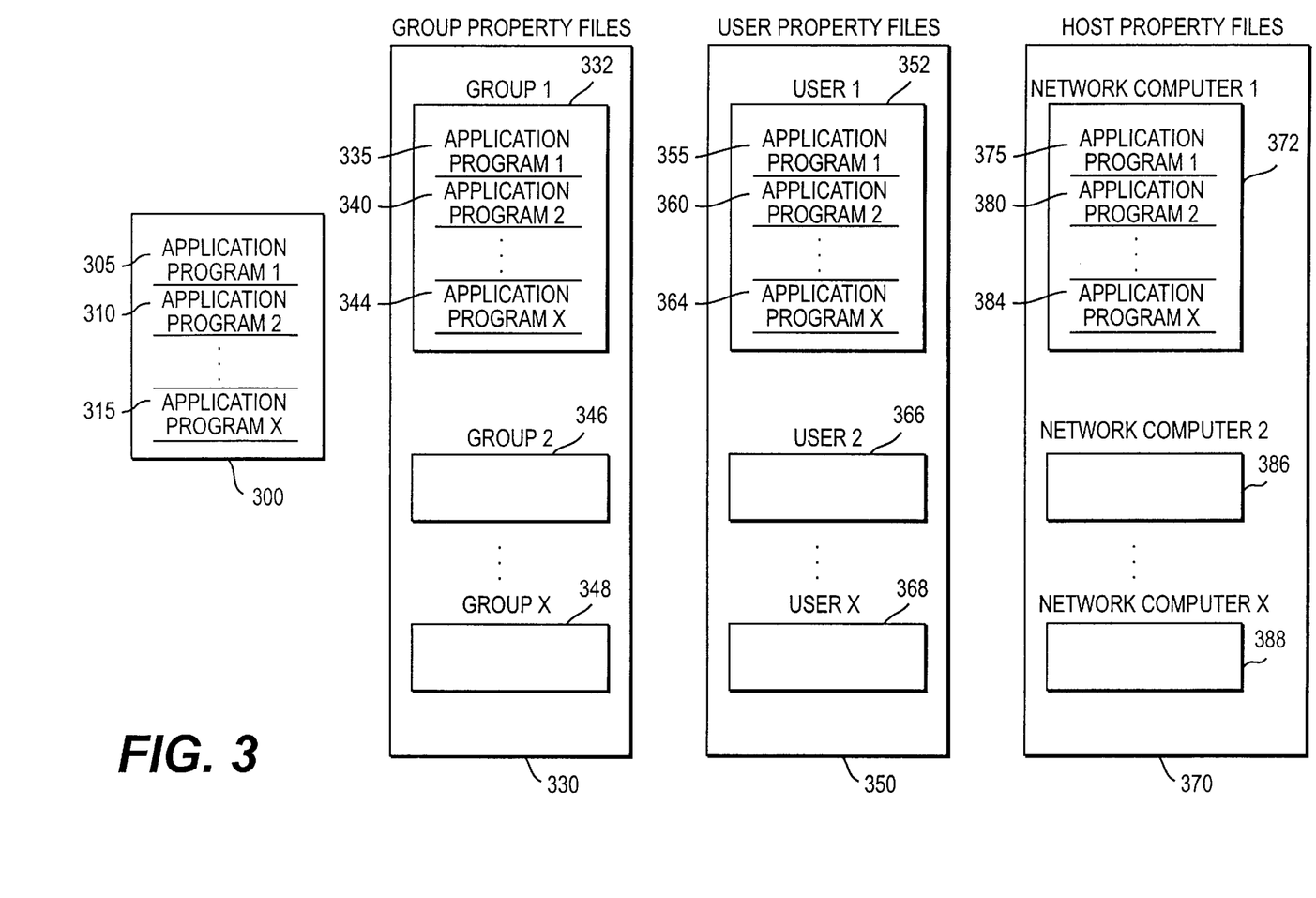
FIG. 3 is a block diagram depicting the organization of property files at a server consistent with the present invention.

FIG. 3 is a block diagram depicting the organization of property files 190 at server 180. In a preferred embodiment, the specified location of property information is one or more files in one or more directories located at server 180. Those of skill in the art will recognize, however, that property information may be stored at other specified locations. For example, the property information may be organized and stored in random access memory (RAM), or in one common file or directory.

Server 180 contains a file 300 that has general information for each application program. Such information may include, for example, the directory path used to access the application program. File 300 also contains an identification of the configuration class within each application program that is used to interpret and edit property information. For example, the configuration class for Application Program 1 is identified in information set 305. Similarly, the configuration classes for Application Programs 2 and X are identified in information sets 310 and 315, respectively.

Server 180 also contains a series of property files 330 that correspond to groups of users. Each group has its own directory that contains property files for application programs for users within that group. For example, Group 1 has a directory 332 that contains property files 335, 340, and 344, for Application Programs 1, 2, and X, respectively. Similarly, Group 2 has a directory 346, and Group X has a directory 348.

These group property files allow a system administrator to configure, simultaneously, an application program's property information for an entire group of users. For example, a system administrator could configure property file 335 for Application Program 1 and store it in directory 332. Thereafter, Application Program 1 would be configured accordingly for any user belonging to Group 1.

Server 180 also contains a series of property files 350 that correspond to specific users. Each user has a separate directory that contains the property files for that user. For example, User 1 has a directory 352 that contains property files 355, 360, and 364, for Application Programs 1, 2, and X, respectively. Similarly, User 2 has a separate directory 366, and User X has a separate directory 368. These user-specific property files allow individual users to maintain the same configuration regardless of the network computer on which they are logged in.

Server 180 also contains a series of property files 370 that correspond to specific network computer machines. Each network computer machine has a separate directory that contains the property files for that machine. For example, Network Computer 1 has a directory 372 that contains property files 375, 380, and 384 for Application Programs 1, 2, and X, respectively. Similarly, Network Computer 2 has a directory 386, and Network Computer X has a directory 388. These property files allow a system administrator to configure a network computer machine to operate in a defined manner regardless of which user is logged into that machine.

Figure 4:
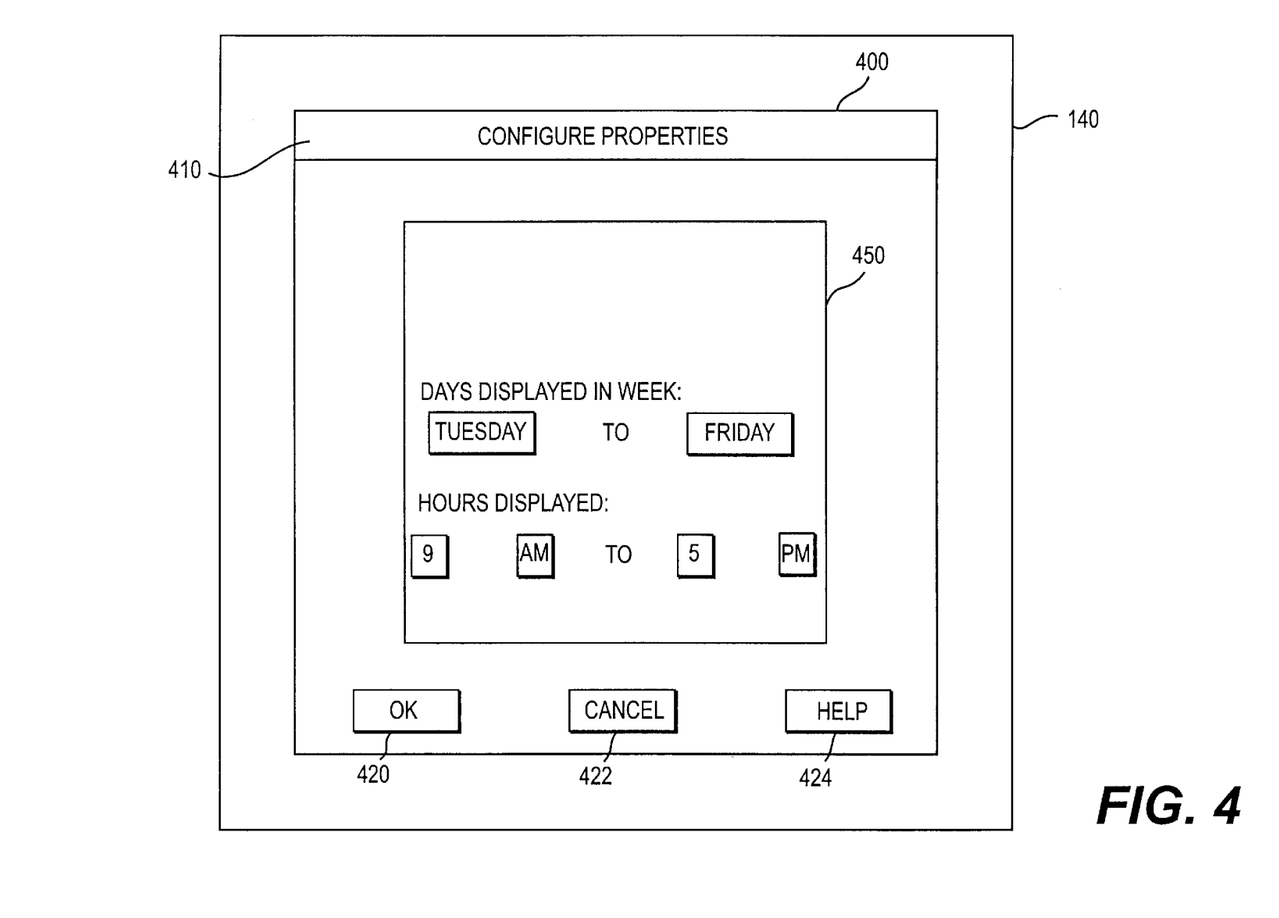
FIG. 4 is a representative screen display that shows an application program's configuration interface within an administrative applet's window.

FIG. 4 is a representative screen display that shows an application program's configuration interface within an administrative applet's window. When applet 230 is executed, it generates a window 400 on display screen 140. Window 400 contains a title bar 410, and buttons 420, 422, and 424, each of which are controlled by applet 230. Window 400 also contains a space 450 within which configuration class 210 operates.

The example shown in FIG. 4 relates to a calendaring application. The configuration class for this application interprets and displays property values that correspond to the first day of the week (Tuesday), the last day of the week (Friday), the beginning hour of each day (9 am), and the ending hour of each day (5 pm). The actual property values corresponding to this display might be, for example: 2 (Tuesday), 5 (Friday), 9, 0 (am), 5, and 1 (pm).

C. Architectural Operation

Figure 5:
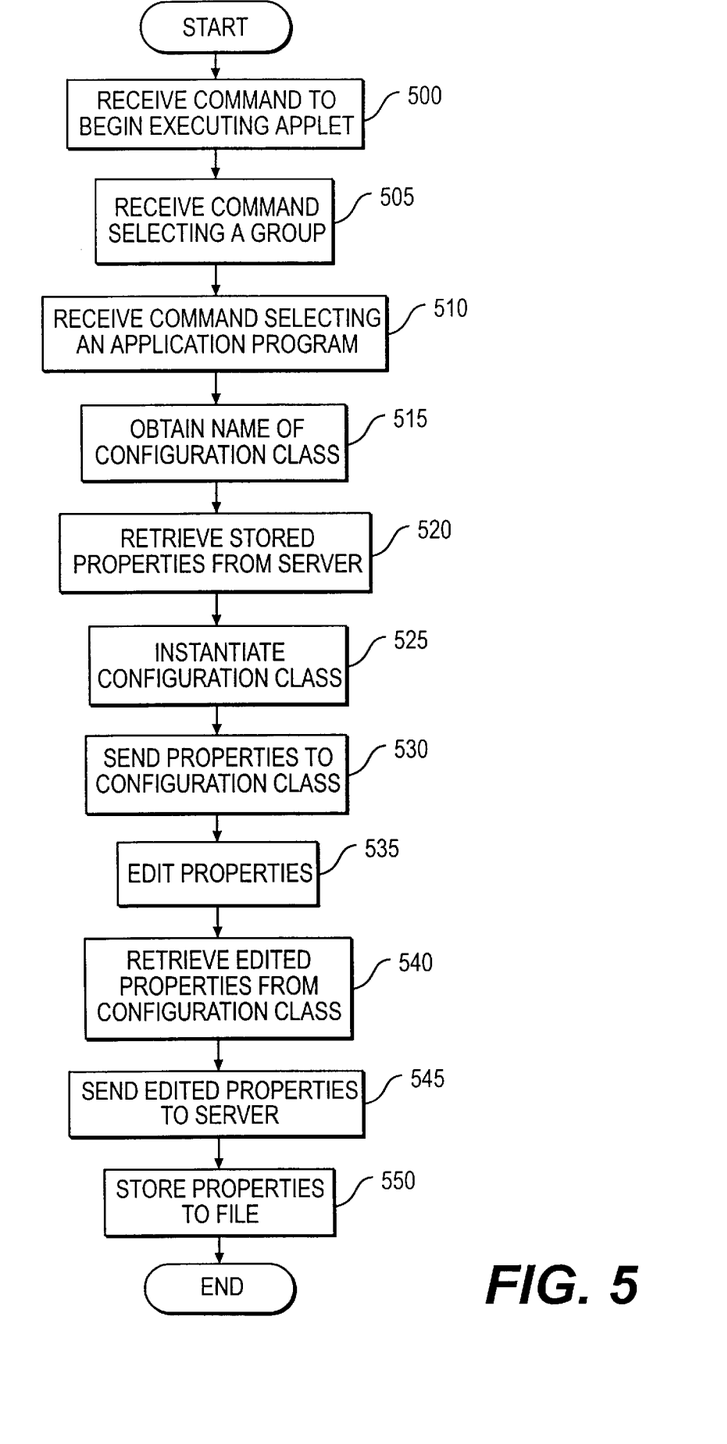
FIG. 5 is a flow diagram of steps performed to edit an application program's properties for a selected group, consistent with the present invention.

FIG. 5 is a flow diagram of steps performed to edit an application program's properties for a selected group in a manner consistent with the present invention. The procedure starts when system 100 receives a command from the administrator to begin execution of applet 230 (step 500). In response, network computer 110 displays on screen 140 a list of available groups. After receiving a command from the system administrator selecting one of these groups (step 505), network computer 110 displays on screen 140 a list of available application programs. System 100 receives a command from the administrator selecting one of these application programs (step 510), in response to which applet 230 reads file 300 to determine the configuration class 210 for the selected application (step 515).

Next, applet 230 retrieves the desired property information from server 180 (step 520). Specifically, applet 230 uses RMI to request the application program's properties for the selected group. In response, server application program 240 reads the application's property file from the selected group's directory and embeds that information in a property object. This property object is transmitted to applet 230 using RMI.

After receiving this property object from server 180, applet 230 creates a display window 400, and instantiates therein configuration class 210 (step 525). An example of such a screen display is described above in reference to FIG. 4. Using interface 220, applet 230 passes to configuration class 210 the property object retrieved from server 180 (step 530).

Configuration class 210 interprets the property information contained in the property object and displays it in the form of labels, descriptions, and values that can be easily understood and manipulated by the system administrator. The system administrator edits the property values as desired by using a user interface (shown in space 450) implemented by configuration class 210 (step 535). When the system administrator is finished editing, applet 230 receives from configuration class 210, across interface 220, a property object containing the edited property information.

Applet 230 receives the edited property object from configuration class 210 (step 540), and employs RMI to save the contained property information. This causes the edited property object to be transmitted to server application program 240 (step 545), which extracts the property information from the edited property object and saves it to the application program's property file in the selected group's directory (step 550).

Throughout the procedure described in reference to FIG. 5, the application program (i.e., its configuration class) need not be aware of the group (or user or network computer) to which the properties belong. The application program simply receives a property object, allows it to be edited, and returns the edited property object. Applet 230 interfaces with server application program 240 (via RMI) to ensure that the properties are retrieved and stored for the proper group (or user or network computer).

D. Conclusion

As described in detail above, methods and apparatus consistent with the present invention allow system administrators to remotely and dynamically edit property files in a network computer environment. These methods and apparatus also allow system administrators to configure user, group, and network computer property files in a manner that is transparent to application programs. The foregoing description of an implementation of the invention has been presented for purposes of illustration and description. For example, the described implementation includes software but the present invention may be implemented as a combination of hardware and software or in hardware alone. Modifications and variations are possible in light of the above teachings or may be acquired from practicing the invention.

Although systems and methods consistent with the present invention are described as operating in the exemplary distributed system and the Java programming environment, one skilled in the art will appreciate that the present invention can be practiced in other systems and programming environments. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is defined by the claims and their equivalents.

What is claimed is:

1. In a system having an application program and associated property information residing at a specified location, a method for interfacing the application program to the property information such that the location of the property information is transparent to the application program, comprising the steps of:

executing an administrative applet at a client;

receiving, at the administrative applet, a command that selects the application program;

receiving, at the administrative applet, a command that selects a client, user, or group of users;

determining a configuration class for the application program;

creating an instance of the determined configuration class inside a window;

sending a request, from the administrative applet to a server application program executing at a server, for property information from a specified location that corresponds to the application program and the selected client, user, or group of users;

receiving the requested property information at the administrative applet from the server application program;

passing the received property information from the administrative applet to the instance of the configuration class;

receiving edited property information from the instance of the configuration class; and sending the edited property information to the server application program for storage at the specified location.

2. In a system having an application program and associated property information residing at a specified location, a method for interfacing the application program to the property information such that the location of the property information is transparent to the application program, comprising the steps of:

sending a request to a server for property information from a specified location;

receiving the requested property information from the server at a client;

passing the property information to a configuration portion of the application program;

receiving edited property information from a configuration portion of the application program; and sending the edited property information to the server for storage at the specified location.

3. The method of claim 2, wherein the step of receiving property information from the server comprises the substeps of:

receiving, at the client, an object containing the requested property information; and extracting the property information from the object.

4. The method of claim 2, wherein the step of sending the edited property information further comprises the step of transmitting the property information using remote method invocation.

5. The method of claim 2, further comprising the step of storing the edited property information at the server at the specified location.

6. The method of claim 2, wherein the step of sending a request to the server comprises the step of sending a request to the server for property information located in a directory that corresponds to a group of users.

7. The method of claim 2, wherein the step of sending a request to the server comprises the step of sending a request to the server for property information located in a directory that corresponds to a user.

8. The method of claim 2, wherein the step of sending a request to the server comprises the step of sending a request to the server for property information located in a directory that corresponds to a client.

9. In a system having an application program and associated property information residing at a specified location, a method for interfacing the application program to the property information such that the location of the property information is transparent to the application program, comprising the steps of:

executing, at a client, a first application program;

receiving at least one command at the first application program selecting a second application program;

sending from the client a request to a server for property information for the selected second application program;

receiving at the first application program property information for the selected second application program;

passing the received property information to the selected second application program; and receiving at the first application program edited property information from the selected second application program.

10. The method of claim 9, wherein the first application program is an applet.

11. A computer-readable medium containing instructions for editing property information for an application program, by:

sending a request to a server for property information that corresponds to the application program;

receiving the requested property information from the server at a client;

passing the property information to a configuration portion of the application program;

receiving edited property information from the configuration portion of the application program; and sending the edited property information to the server for storage.

12. The computer-readable medium of claim 11, wherein the step of sending the edited property information further comprises the step of transmitting the edited property information using remote method invocation.

13. The computer-readable medium of claim 11, further comprising storing the edited property information at the server at a specified location.

14. The computer-readable medium of claim 11, wherein the step of sending a request comprises the step of sending a request to the server for property information from a directory that corresponds to a group of users.

15. The computer-readable medium of claim 11, wherein the step of sending a request comprises the step of sending a request to the server for property information from a directory that corresponds to a user.

16. The computer-readable medium of claim 11, wherein the step of sending a request comprises the step of sending a request to the server for property information from a directory that corresponds to a client.

17. A computer-readable medium containing instructions for editing property information from a client, by:

executing, at the client, a first application program;

receiving at least one command at the first application program, from the system administrator, selecting a second application program;

determining a configuration class for the selected second application program;

creating an instance of the determined configuration class inside a window; and receiving property information for the selected second application program at the instance of the determined configuration class.

18. The computer-readable medium of claim 17, wherein the first application program is an applet.

19. An apparatus for editing property information for an application program, comprising:

means for sending a request to a server for property information that corresponds to the application program;

means for receiving the requested property information from the server at a client;

means for passing the property information to a configuration portion of the application program;

means for receiving edited property information from the configuration portion of the application program; and means for sending the edited property information to the server for storage.

20. A system for editing property information for an application program, comprising:

a memory having program instructions, and a processor configured to use the program instructions to:

send a request to a server for property information that corresponds to the application program;

receive the requested property information from the server at a client;

pass the property information to a configuration portion of the application program;

receive edited property information from the configuration portion of the application program; and send the edited property information to the server for storage.

21. In a system having an application program and associated property information residing at a specified location, a method of interfacing the application program to the property information such that the location of the property information is transparent to the application program, comprising the steps of:

determining a location for the property information;

retrieving the property information from the location;

providing the property information to the application program;

modifying the property information by using the application program; and storing the modified property information in the location.

22. The method of claim 21, wherein the storing step comprises the step of storing the modified property information in the determined location using a remote method invocation.

23. The method of claim 21, wherein the determining step comprises the step of identifying a location for property information associated with the application program and corresponding to a group of users.

24. The method of claim 21, wherein the determining step comprises the step of identifying a location for property information associated with the application program and corresponding to a user.

25. The method of claim 21, wherein the determining step comprises the step of identifying a location for property information associated with the application program and corresponding to a host.

26. The method of claim 21, wherein the retrieving step comprises obtaining the property information from the location using a remote method invocation.

\* \* \* \* \*